United States Patent
Van Schaack et al.

(10) Patent No.: US 11,377,019 B1
(45) Date of Patent: Jul. 5, 2022

(54) CONTAINER TRUCKLOAD RESTRAINT FEATURE (CTRF) INCORPORATED IN EXTRUDED SIDE WALL (ESW) ORDNANCE CONTAINERS

(71) Applicant: The United States of America as Represented by the Secretary of the Navy, Indian Head, MD (US)

(72) Inventors: Robert J. Van Schaack, Wall Township, NJ (US); Matthew A. Boyer, Califon, NJ (US); William M. Wheeler, Eatontown, NJ (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 136 days.

(21) Appl. No.: 16/873,403

(22) Filed: Apr. 7, 2020

(51) Int. Cl.
 *B60P 7/08* (2006.01)
 *B60P 7/13* (2006.01)

(52) U.S. Cl.
 CPC .................................. *B60P 7/13* (2013.01)

(58) Field of Classification Search
 CPC .. B60P 7/13; B60P 7/08; B60P 7/0807; B60P 7/10; B60P 7/18
 USPC .... 410/32, 33, 41, 80, 97, 99, 100, 106, 116
 See application file for complete search history.

(56) References Cited

U.S. PATENT DOCUMENTS

| | | | |
|---|---|---|---|
| 1,638,612 A * | 8/1927 | Baus | B61D 45/002 410/120 |
| 4,515,506 A | 5/1985 | Van Gompel et al. | |
| 7,556,463 B1 * | 7/2009 | Hall | B60P 7/0815 410/106 |
| 8,356,963 B2 * | 1/2013 | Frett | B61D 45/002 410/97 |
| 9,738,211 B2 | 8/2017 | Adams | |
| 2007/0264097 A1 * | 11/2007 | Fei | B61D 45/00 410/32 |
| 2008/0019788 A1 * | 1/2008 | Clarke | B65D 71/0096 410/116 |
| 2008/0247838 A1 * | 10/2008 | Wiebe | B60P 7/0823 410/100 |

* cited by examiner

*Primary Examiner* — Stephen T Gordon
(74) *Attorney, Agent, or Firm* — Fredric J. Zimmerman

(57) ABSTRACT

The apparatus includes metal elongate plates shaped to be received through open ends of the aluminum extruded side walls found on munition containers. The extruded side walls provide excellent side support and overall rigidity to the containers. Each of the elongate plates has an end with an upper slot through which a chain Can slide, therein providing lateral support from a trailer's side rail to the load. Each of the elongate plates has a pronged end with a pair of prongs that projects further outward. The apparatus, in combination with conventional tractor trailer truck gear, functions to provide lateral and longitudinal support to a stack of containers.

13 Claims, 10 Drawing Sheets

Fig. 7a

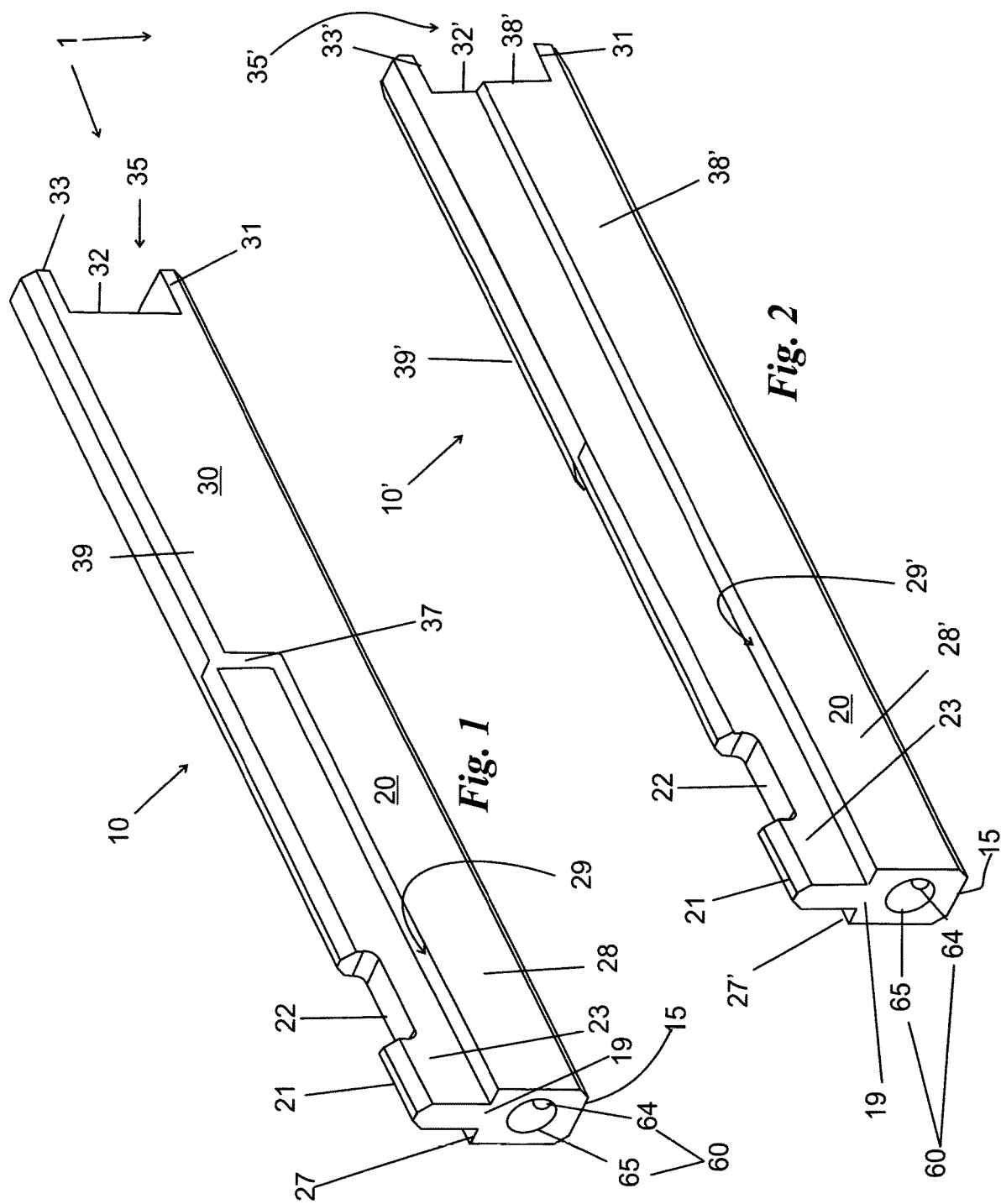

CONTAINER TRUCKLOAD RESTRAINT FEATURE (CTRF) INCORPORATED IN EXTRUDED SIDE WALL (ESW) ORDNANCE CONTAINERS

STATEMENT OF GOVERNMENT INTEREST

The invention described herein may be manufactured and used by or for the Government of the United States of America for Governmental purposes without the payment of any royalties thereon or therefore.

FIELD OF THE INVENTION

The invention relates generally to container truckload restraint apparatus that facilitates shipping ordnance containers, such as MK-781, which have aluminum extruded side walls (ESW). More particularly, the invented apparatus enables the containers to be shipped en-masse in stacks on steel or wood flatbed tractor-trailers using minimal dunnage.

BACKGROUND OF THE INVENTION

The invention is a restraint apparatus that facilitates shipping ordnance containers, such as MK-781. Example versions of the containers include a MK-781 container and a CNU-595/Econtainer. These containers have aluminum extruded side walls (ESW) that utilize Skid Extrusion p/n 6213803. Historically, shipping on flatbed trailers employed wood dunnage. Wood dunnage for flatbed trailers typically utilizes wooded blocking assemblies that includes multiple 2 inch by 6 inch boards (about 288 board ft.) and associated fasteners (i.e. nails, etc.) employed to restrain the freight on flatbed trailers with a wooden deck. The weight of the wood dunnage alone is about 911 lbs.

As discussed, flatbed truckloads of ordnance have traditionally been shipped with web straps providing the required vertical restraint and wood blocking and bracing nailed to the truck's deck to provide the required longitudinal and lateral restraint. Within the last few years, the trucking industry has been increasing the use of metal deck trailers which are not compatible per military truckload guidelines as shown in "TRUCKLOAD, MK 67 SUBMARINE LAUNCHED MOBILE MINE (SLMM) IN MK 781 MOD 0 CONTAINER". The MK 781 and CNU-595/E containers are reusable, and largely constructed of aluminum extruded side walls. The containers have forklift pockets, end lift adapters, hoist rings and center lift fittings. Polyethylene foam or shock mounts provide shock isolation to mitigate vibration and shock during shipment.

In general, the restraint systems that have been developed are principally for securing containers on flatbed tractor trailers.

Qingdao Zhengtai Cargo Control Co., Ltd of Tongji, Jimo, Qingdao, of China sells a Cargo Lock Plank. The plank is comprised a rectangular tubular aluminum section with an annular adjustable I-beam sections that can be extended outward. A side of the plank has a button, which presumably is locking. The concept artificially reduces the useable volume, but does not effectively compensate for high weight.

SUMMARY OF THE INVENTION

The invention includes a container truckload restraint apparatus that facilitates shipping ordnance containers, such as MK-781, which have aluminum extruded side walls (ESW).

An aspect of the invention is that the restraint apparatus is a plurality of CTRF plates that are installed in chambers of the sidewalls of the container, wherein on assembling into a stack on a trailer the appropriate CTRF plates are deployed.

A second aspect of the invention is that the restraint apparatus can be quickly deployed and utilized with conventional shipping gear on a flatbed tractor-trailer. Conventional shipping gear includes a tensioned element selected from chains, cables, straps, and a tensioning element selected from ratchets, winches, and turnbuckles. Metal and/or fabric straps are typically employed to augment vertical restraint.

A third aspect of the invention is that the restraint apparatus, combined with the conventional shipping gear, provides lateral and longitudinal restraint.

A fourth aspect of the invention is that a CTRF plate can be slid outward from its stored position therein providing an upper self-adjusting guide channel for the tensioned element, which are connected to lateral rails on the trailer proximate to the container, wherein there is minimal abrasive contact of the container with the tensioned element.

A fifth aspect of the invention is that the CTRF plate can be reversed such that the upper self-adjusting guide channel portion of CTRF plate is secured but moveable in the chamber in which it is stored, or alternatively the CTRF plate can be reversed, wherein a protruding portion is in abutment with an occlusive tab partially occluding the chamber.

A sixth aspect of the invention is that the protruding portion of the CTRF plate has a forked end that functions as a spar to divert a tensioned element away from one or more containers after each of tensioned element is tensioned, therein cumulatively providing lateral and longitudinal restraint to a containers shipped three or more wide on a truck.

A seventh aspect of the invention is a system for restraining at least one layer of containers, that is three containers across, being shipped on a commercial munitions carrier.

BRIEF DESCRIPTION OF THE DRAWINGS

The foregoing invention will become readily apparent by referring to the following detailed description and the appended drawings in which:

FIG. 1 is a perspective view of a CTRF plate with a left side abutment feature, which when protruding as viewed from a FWD END of the container, as shown in FIG. 8 would abut a left-side (starboard container side) occlusive tab of a left second open-ended vertically rectangular tubular chamber, and likewise when protruding and viewed from the AFT END of the container the left side CTRF plate would abut a container left-side (port container side) occlusive tab on an opposing left second open-ended vertically rectangular tubular chamber; wherein the left occlusive tab (starboard side) and the opposing left (port side) tab both have tabs that partially occlude the opening of the chambers, therein imparting shape restrictions;

FIG. 2 is a perspective view of another CTFR plate albeit with a right side abutment feature, wherein when protruding as viewed from the FWD END of the container, as shown in FIG. 8, FIG. 8a and FIG. 9 it abuts a right-side (port container side) occlusive tab on a right second open-ended vertically rectangular tubular chamber;

FIG. 7a is an exploded view that illustrates that every chamber of a container that has an occlusion tab is filled with a stored restraint apparatus, either a first plate 10 or a second plate 10';

FIG. 8a is an exploded perspective view of a bottom right corner of the FWD END MK 781 illustrated in FIG. 8, that illustrates a port-side occlusive tab of a port side second open-ended vertically rectangular tubular chamber.

DETAILED DESCRIPTION OF THE INVENTION

Figure 8:
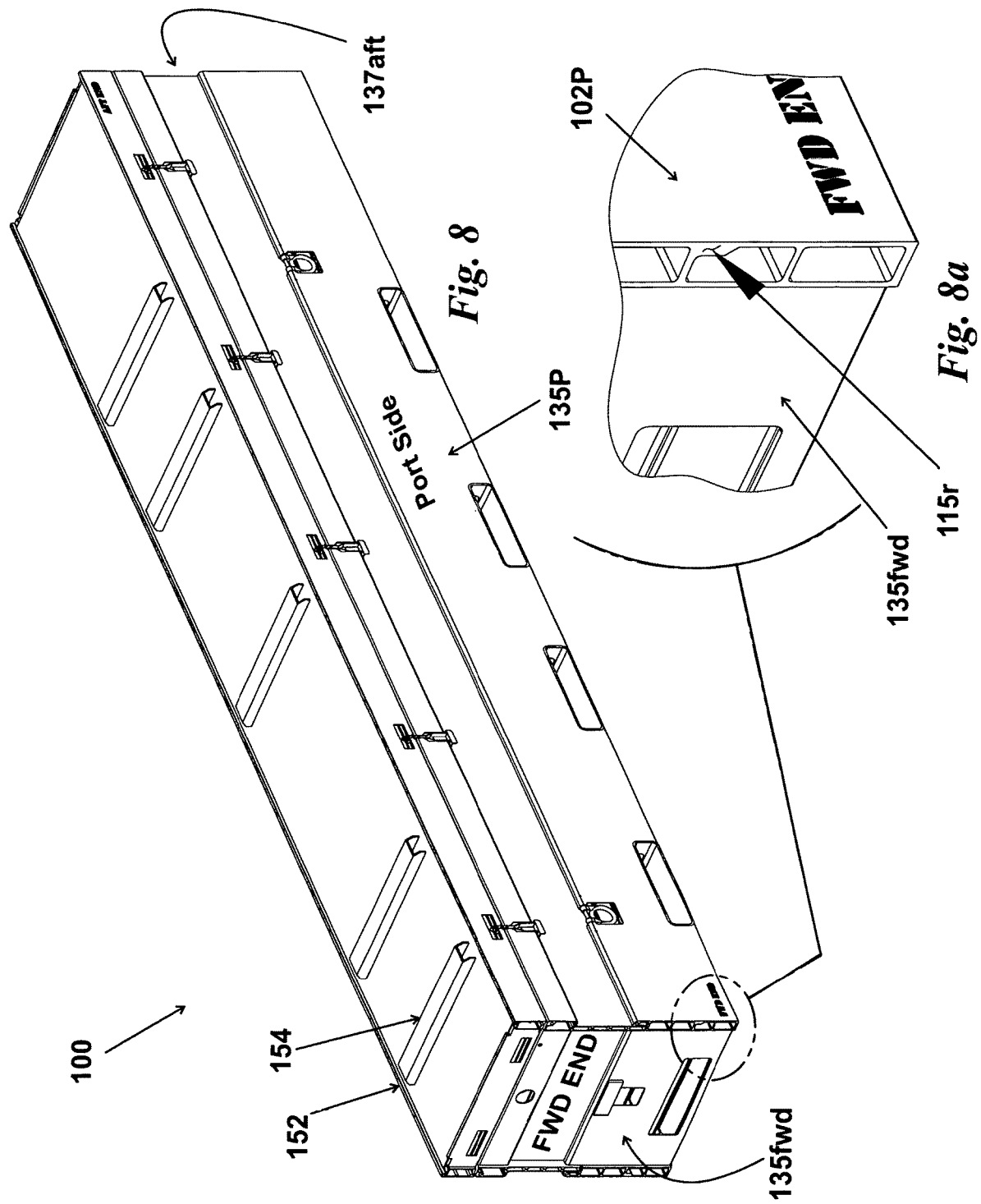
FIG. 8 is a perspective overhead view of a specific example of a robust container having aluminum extruded side walls, Mk 781, wherein all the CTRF plates are removed from the container, where the view illustrates that the container has a perimeter upper ridge 152 and a plurality of cross-tubular beams 154 that, that taken together, facilitate forming nested layers of containers into a stack.
Figure 9:
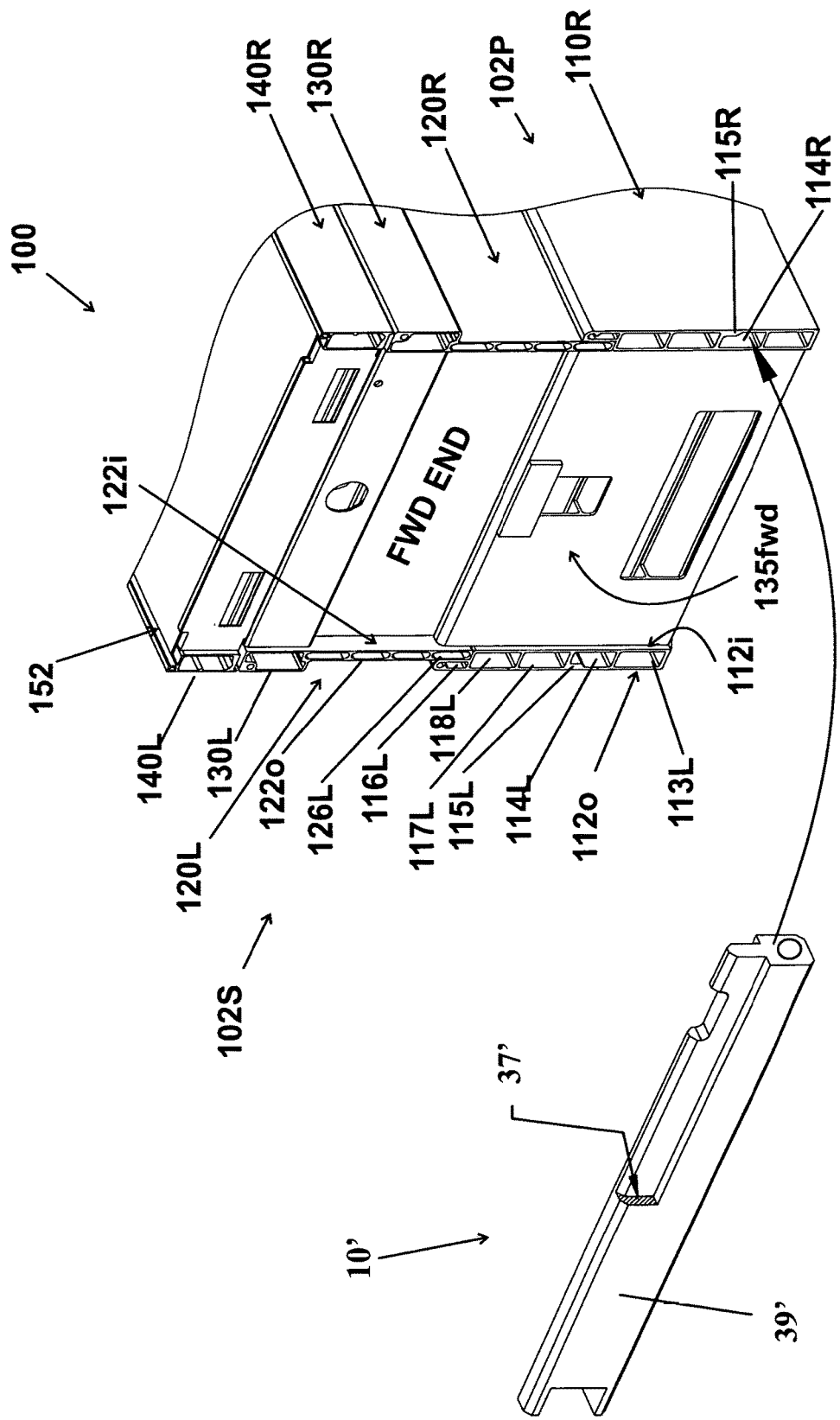
FIG. 9 is a perspective view that illustrates an action wherein the CTRF plate has been reversed and closer to the reader so its size is exaggerated, and is being repositioned in the right second open-ended vertically rectangular tubular chamber so that the forked end portion of the CTRF plate is protruding, wherein the forked end portion has a wall that abuts the occlusive tab of the FWD END of the MK 781 container.

An understanding of containers having aluminum extruded side walls facilitates understanding the restraint apparatus. As shown in FIG. 8, FIG. 8a and FIG. 9 the side-walls of the illustrated MK 781 extend lengthwise across a starboard side 135S (that is on partially visible) and a port-side 102P of the container 100. The extruded wall is substantially a matrix of chambers with an outer wall 112o,1220, and an inner wall 112i,122i. A lower starboard side wall 102S includes four open-ended vertically aligned rectangular tubular chambers 113L, 114L,117L,118L. A left second open-ended chamber 114L on the starboard side has an occlusive tab 115L. A lower port side wall 102P has a right second open-ended chamber 114R that is occluded by tab 115R. The tabs 115L,115R impart shape restrictions on an inserted CTRF plate when pulled out, reversed and reinserted for restraint of inboard containers on a flatbed truck.

A fifth chamber 116L is a right narrow vertically rectangular tubular chamber is a component of the outer wall 112o, and it overlaps an inner narrower vertically rectangular tubular chamber 126L of a left second wall 120L that has a second outer wall 122o and a second inner wall 122i. The second wall 120L has a total of four narrow vertically rectangular tubular chambers 126L and one wide vertical rectangular tubular chamber 130L. The cover of the container defines a third wall 140L which is a single chamber. The opposing right walls on the port side 102P are 110R, 120R,130R, and 140R.

As shown in FIG. 9, the CTRF plate has a right side (port side) abutment wall 37', and so it will not fit into chamber 114L with tab 115L. The second plate 10' will only fit into chamber 114R with tab 115R on the FWD END 135fwd. On the AFT END 135aft, the plate 10' will fit into the AFT END (which is not visible) starboard chamber 114R, as it has a right tab 115R for right side abutment wall 37'.

Each MK 781 container has two FWD END chambers 114L,114R and AFT END chambers 114L,114R for a total of four open ended second open-ended vertically rectangular tubular chambers 114. Likewise, there are four tabs, two on the FWD END 115L,115R and two on the AFT END. The FWD END tabs 115L and 115R are mirror images of the AFT END tabs, so a right sided tab on the FWD END is a left sided tab on the AFT END, and a left sided tab on the FWD END is a right sided tab on the AFT END.

The Mk 781 Container is 175 inches long, 28.38 inches wide, and 32.75 inches tall. Its gross weight is 2,517 lbs.

For the Mk 781 container, in-light of its heft, the maximum quantity that can be shipped is weight limited. Generally, the maximum weight that a typical commercial munitions carrier vehicle can accommodate, without exceeding the vehicle gross weight limit is 80,000 lbs. A commercial munitions carrier itself weighs 38,000 lbs, so that leaves a load weight of about 42,000 lbs. The weight constraints limits shipments of MK 781 containers to 16 containers, and for all practical concerns this is with or without loaded containers. If each layer has three containers, and a stack has two layers there are six containers. Two stacks has containers, and enough trailer length to accommodate 18 containers, but weight constraints limit a third stack to four containers.

Some tractor-trailer combinations may be on the lighter side, and therefore may be able to accommodate one or two additional containers. In general the MK 781 container weighs out a vehicle before it uses up all the available space. Potentially, an empty MK 781 container could be carried in greater numbers, as many as 27 containers on a trailer, with three stacks of nine containers configured three-wide by three-high.

The invention isn't limited to the MK 781 Container. It can be used on any container that uses ESW with an extrusion profile utilizing skid extrusion drawing number 6213803. The CTRF can also be modified as necessary to be deployed in other standard ESW container skid or base extrusions. There are several containers that utilize skid extrusion drawing number 6213803 with occlusive tabs that partially occlude the opening, therein imparting shape restrictions. The CNU-595/E container is another example. The CNU-595/E has a volume that is 17% greater than the MK 781 and a gross weight that is 57% heavier, therein reducing the number of containers per commercial munitions carrier.

In an exemplary embodiment, the restraint apparatus 1 is a pair of CTRF plates 10,10' that are preferably made of aluminum. Other metals such as steel and other iron based alloys may be considered, but dissimilar metal protections will need to be invoked as they will be used in direct contact with the container aluminum sidewalls.

The dimensions of the restraint apparatus 1 are selected to be proportionately in conformance to the dimensions of the container(s) being restrained.

The CTRF plate 10' shown in FIGS. 1 and 2 has a right side abutment feature 39' with a wall 37', and in FIG. 9 it is being inserted into the container 100. The prongs 33',31 on the pronged end 35' are to be projecting. If CTRF plate 10' is reversed, and it is being positioned in a first right wall 110 of the right side 102R in the second chamber 114R. Note the second chamber 114R has a right-side 102R occlusive tab 115B, and the wall 37' will abut the right-side 102R tab 115R of the right second open-ended vertically rectangular tubular chamber 114R. Similarly, the CTRF plate 10' can be inserted into AFT END of the container 100, which is the mirror image of FWD END of the container 100, and therefore a receiving chamber is on an opposing side of the container 100.

Likewise the CTRF plate 10 illustrated in FIG. 1 is substantially the same, albeit with a left side abutment feature 39 which is a left wall 37, and prongs 31,33 on the pronged end 35 upon positioning will be projecting from chamber 114L and in abutment with the occlusive tab 115L. Similarly, the CTRF plate 10 can be inserted into the AFT END of the container 100, which is the mirror image of FWD END of the container 100, and therefore a receiving chamber is on the opposing side of the container 100.

Figure 1B:
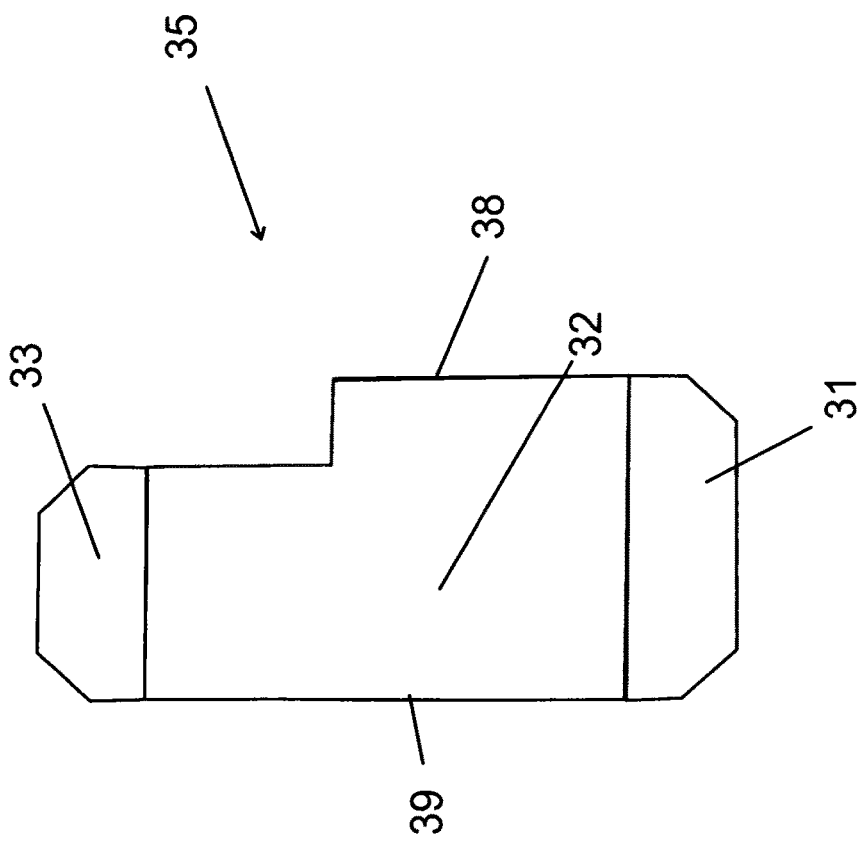
FIG. 1b is a planar end-on opposing view of the CTRF plate shown in FIG. 1a, wherein the opposing planar end-on view illustrates a forked end with an upper prong and a lower prong that function as upper and lower guiding restraints for tensioned elements, therein producing longitudinal restraint on one or more containers.
Figure 1C:
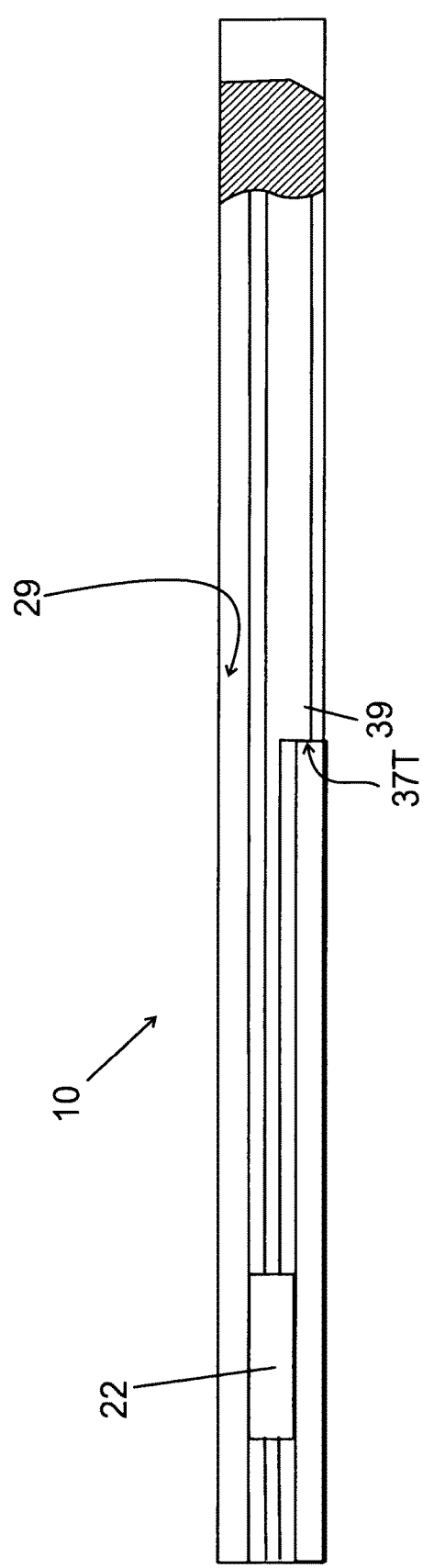
FIG. 1c is a partial overhead top planar view of the CTRF plate having the starboard side abutment feature illustrated in FIG. 1.
Figure 1D:
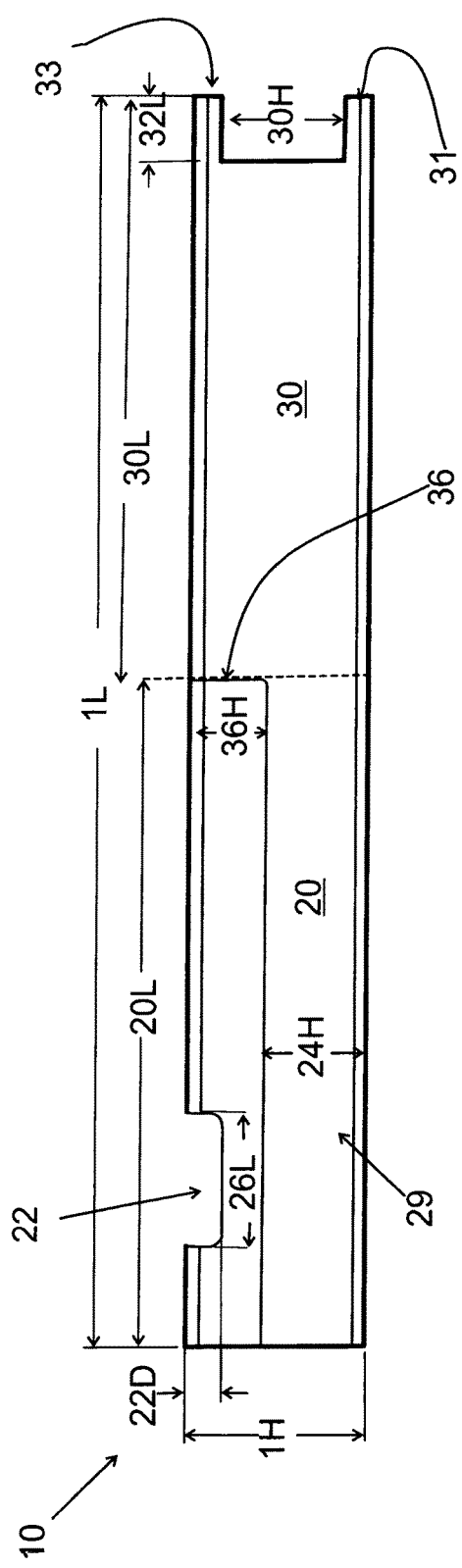
FIG. 1d is a side view of the CTRF plates of the restraint apparatus as illustrated in FIG. 1 and FIG. 2.
Figure 3:
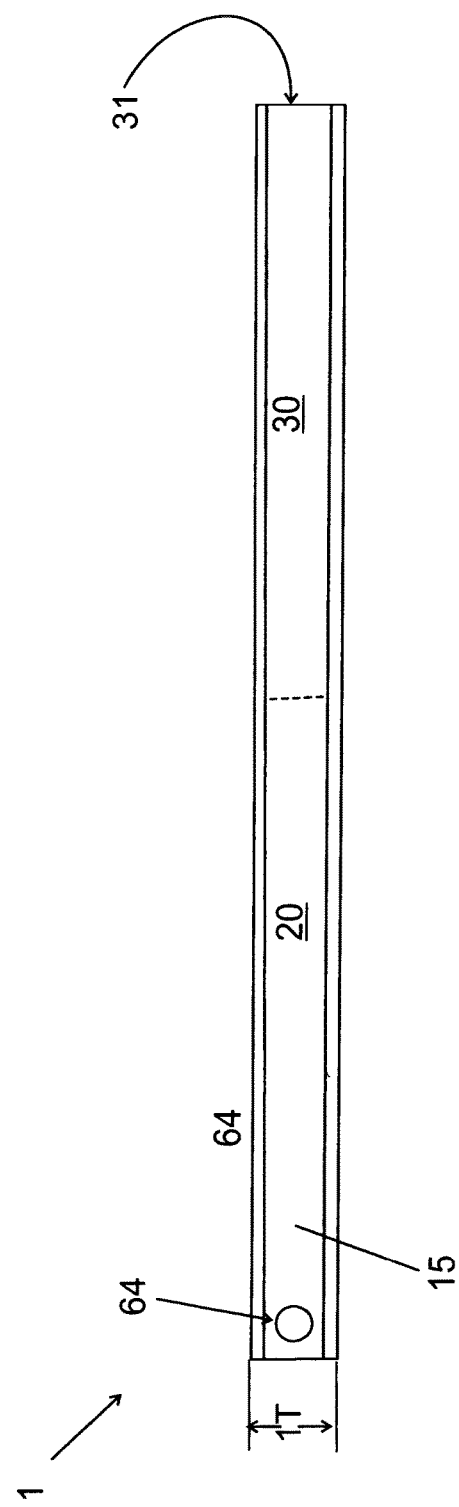
FIG. 3 is a bottom planar view of the CTRF plates illustrated in FIG. 1 and FIG. 2, which illustrates the symmetry in the bottom view of the CTRF plates and a bottom view of the finger lift.
Figure 4:
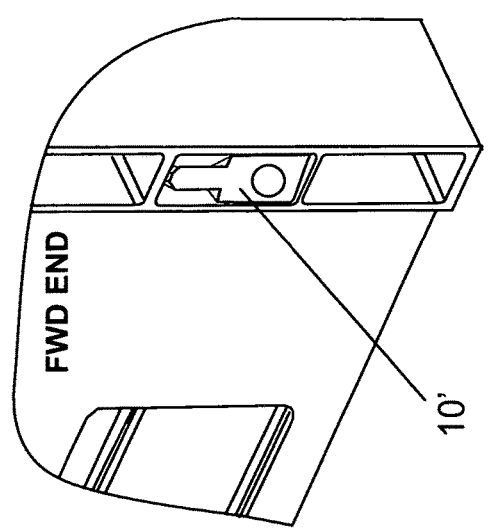
FIG. 4 is a cut-away perspective view illustrating the CTRF plate stored in a second chamber of a container having aluminum extruded sidewalls.
Figure 5:
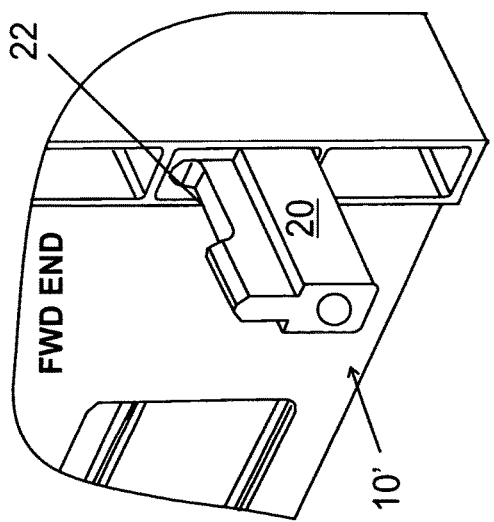
FIG. 5 is a perspective view of the CTRF plate shown in FIG. 4, wherein the CTRF plate has been partially pulled out, exposing the upper self-adjusting guide channel portion of CTRF plate that accommodates tensioning chains for outboard containers on a flatbed truck.
Figure 6:
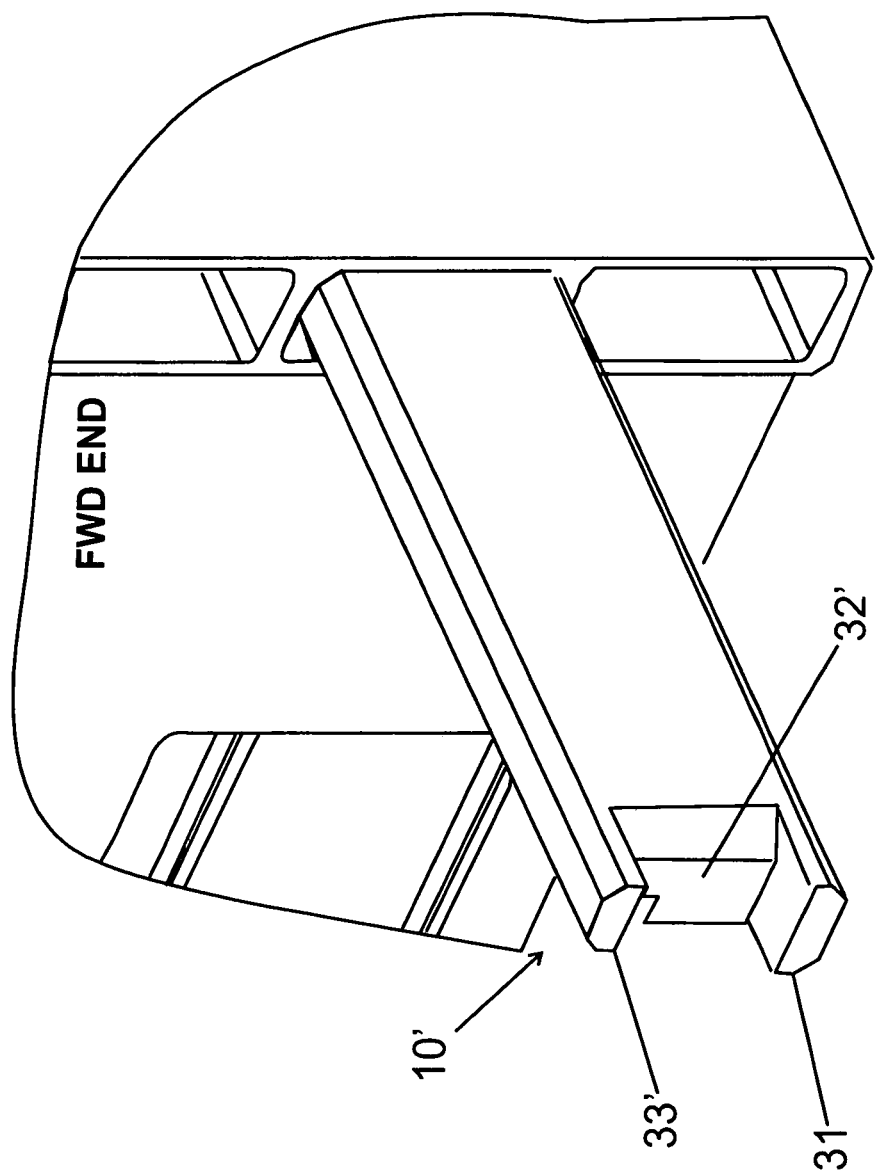
FIG. 6 is a perspective view of the CTRF plate shown in FIG. 4 and FIG. 5, wherein the CTRF plate has been completely pulled out of the open-ended vertically rectangular tubular chamber of the ESW, the CTRF plate has been reversed, and repositioned back in the tubular chamber so that the forked end portion of the CTRF plate is protruding to accommodate tensioning chains for inboard containers on a flatbed truck, wherein when reversed the right/port-side abutment feature of CTRF plate has a wall that is abutting the occlusive tab, wherein the occlusive tab is a geometric feature of the second chamber of the ESW.

As further illustrated in FIG. 1d, the restraint apparatus 1 has an overall length 1L of about 18.75 inches. Both of the CTRF plates 10,10' are substantially a solid bar tooled to have a thickness 1T, as shown in the bottom view in FIG. 3, of about 1.25 inches and a maximum height 1H of 2.59 inches. The restraint apparatus is contiguous, having two sections 20 and 30, where the sections differ in form and function. A dashed line indicates a transition point of the sections. Longer section 20 has a length 20L which is about 10 inches long, as shown in FIG. 1d and FIG. 3, and shorter section 30 has a shorter length 30L of that is about 8.75 inches long. The shorter section 30 terminates with a pronged end 35 having an upper prong 33 and a bottom prong 31, and for CTRF plate 10' there is a pronged end 35' with an upper prong 33' and a bottom prong 31, reflecting the chirality. The prongs have a prong length 32L of about 0.75 inches long. The bottom prong 31 at its widest is about 1.26 inches and 0.4 inches thick, and the upper prongs 33, 33' at its widest is 0.91 inches and also about 0.4 inches thick. The prongs are separated by a prong space 30H of 1.79 inches. A longer section wall 24 has a height 24H of about 1.5 inches high.

Figure 1A:
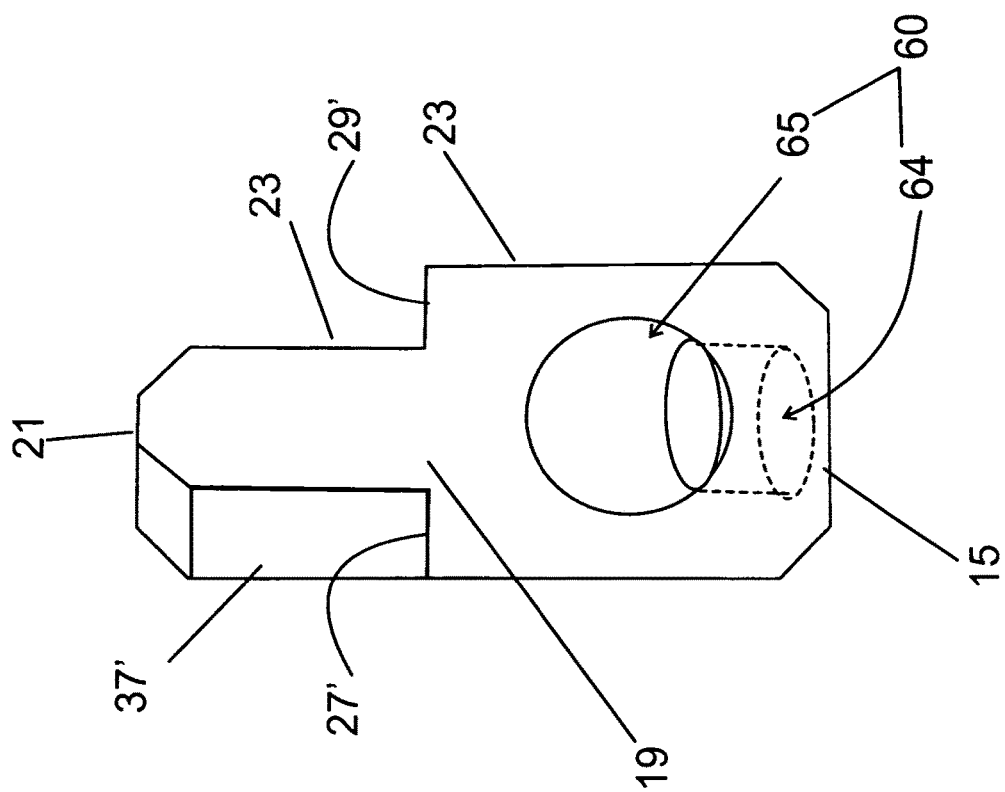
FIG. 1a is a planar end-on view of the CTRF plate with the left side abutment feature shown in FIG. 1, wherein the planar end-on view illustrates a finger lift feature, that is a pair of openings that facilitate removing the CTRF plate from a stored position in a chamber.
Figure 2A:
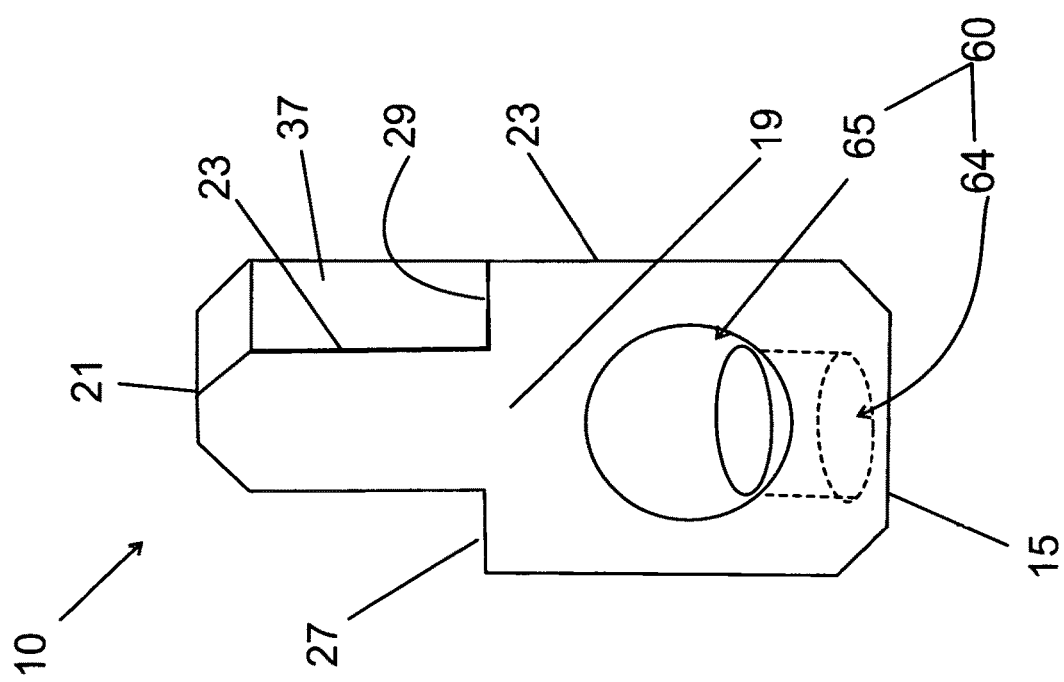
FIG. 2a is a planar end-on view of the CTRF plate with the right side abutment feature shown in FIG. 2, wherein the planar end-on view illustrates the finger lift feature.

As viewed in FIG. 1 and FIG. 2, the section 20 has an upper center chamfered wall 21 that is about 0.55 inches thick. About 1.5 inches from an end of the wall 21 is an upper self-adjusting guide open channel that is 2 inches long and 0.5 inches deep. A finger lift 60 as shown in FIGS. 1,1a,2 and 2a includes an end opening 65 in an end face 19 and a bottom opening 64 in the bottom 15. The end opening 65 has a diameter of about 0.75 inches and the bottom opening 64 has a diameter of about 0.5 inches. The maximum thickness of section 20 is 1.25 inches, with a ledge width of 0.35 inches. The ledge thickness 27,29 for the first plate 10, shown in FIG. 1, is also the first plate 10 thickness 37T of the left side abutment feature 36 of section 30 transitions into the stop 37, as shown in FIGS. 1a and 1c.

Figure 2B:
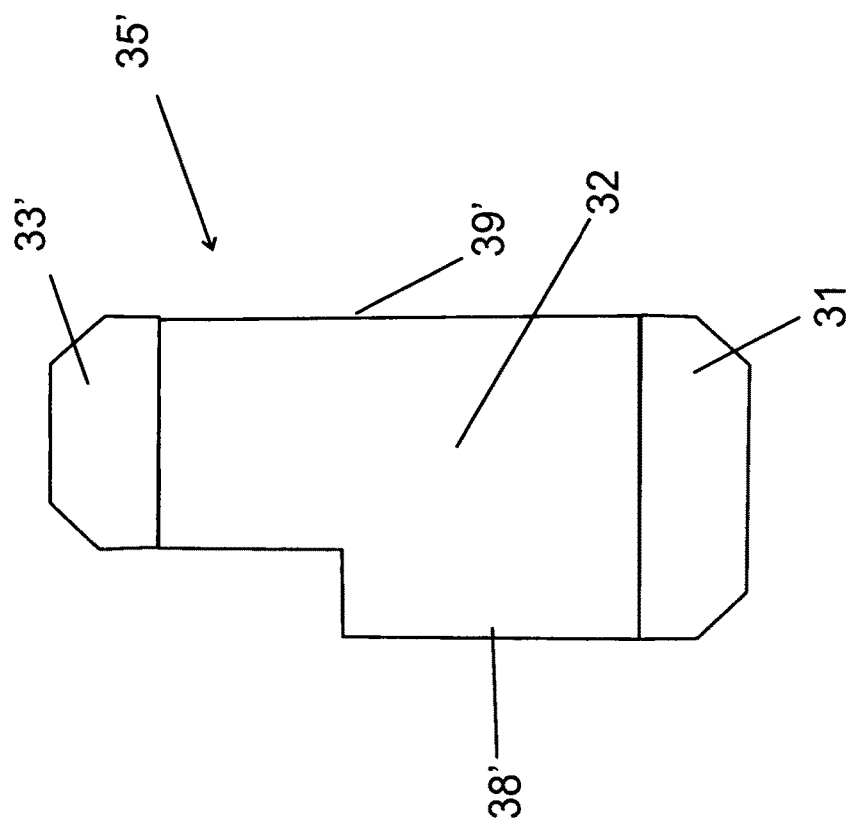
FIG. 2b is a planar end-on opposing view of the CTRF plate shown in FIG. 2a, wherein the opposing planar end-on view which is substantially a mirror image of FIG. 1b.
Figure 2C:
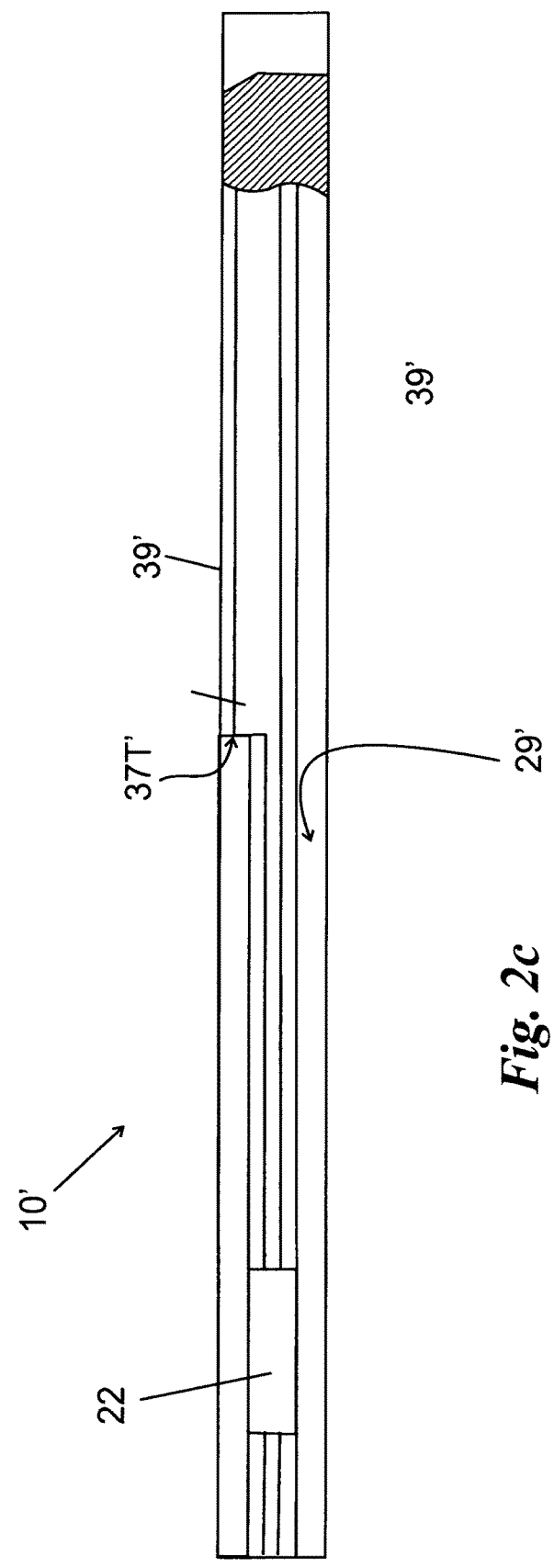
FIG. 2c is a partial overhead top planar view of the CTRF plate with the port side abutment feature illustrated in FIG. 2.

The second plate 10' has a thickness 37T' and forms the right side abutment feature 39', which transitions into the stop 37' as shown in FIG. 2c.

The forked end of the first plate 10 and the second plate 10' have largely been discussed. As shown in FIG. 1b the first plate has a pronged end 35, with an upper prong 33 and a lower prong 31 that function as upper and lower guiding restraints for the tensioned elements 120. The prongs extend from the terminal end 32 of section 30. The terminal end of the abutment 38 is contiguous with the section 30. In FIG. 2b the second plate, the pronged end 35' has an upper prong 33' and a lower prong 31 that function as upper and lower guiding restraints for the tensioned elements 120. The prongs extend from the terminal end 32 of section 30. The terminal end of the abutment 39' is contiguous with the section 38'.

The invention is compatible with the practice of using traditionally sized chains (about 5/16 inch" to 3/8 inch), cables, webbings, straps and tightening mechanisms (for example turnbuckles, winches, ratchets). Tensioned elements are selected from the group consisting of chains, cables, straps, webbings and combinations thereof. Tensioning element of the tensioned element is selected from ratchets, winches, and turnbuckles, and other combinations. The tensioning elements provide the required longitudinal and lateral restraint when being shipped on flatbed trailer trucks.

Figure 7:
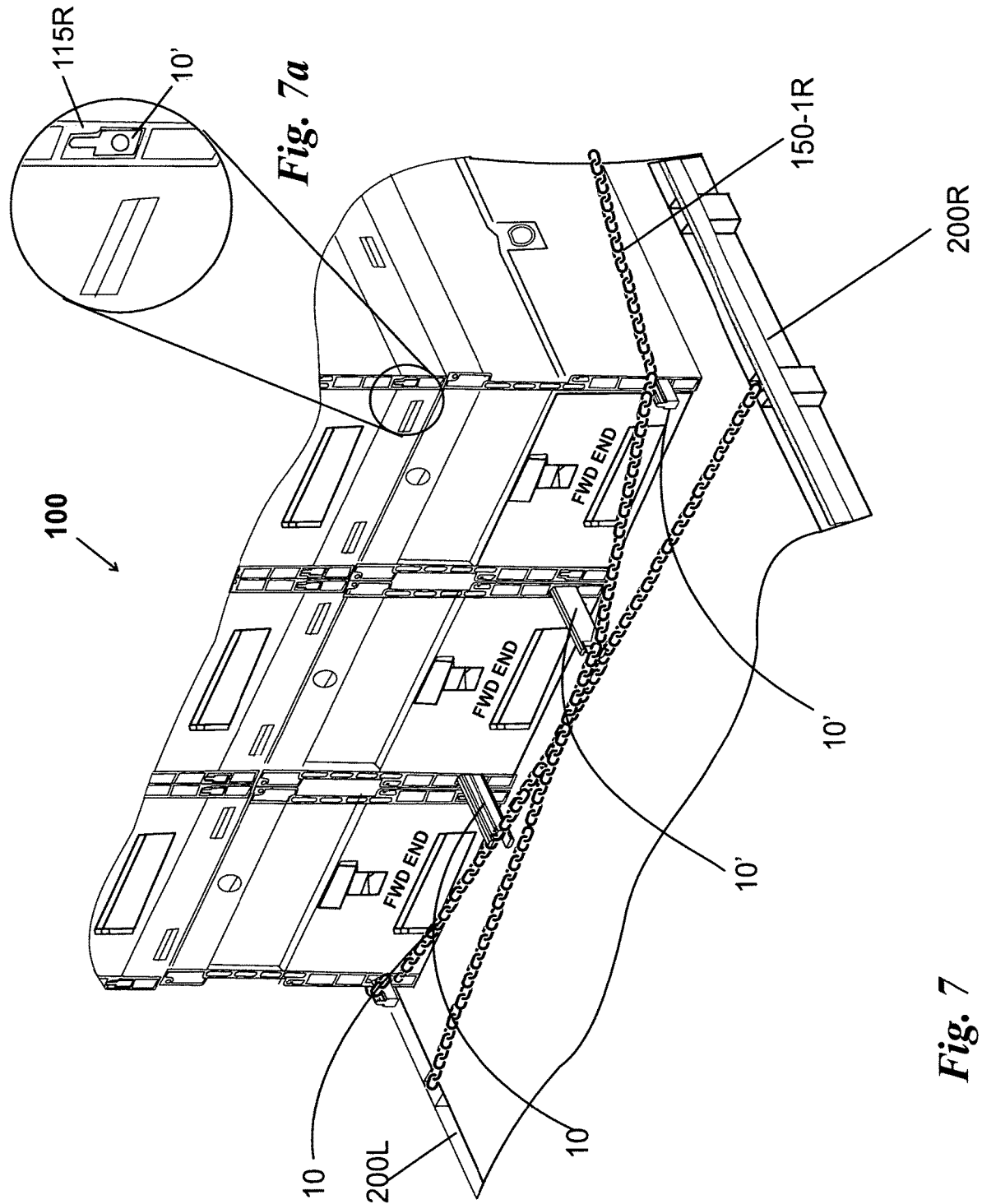
FIG. 7 is a partial overhead view of a stack of six containers on a trailer, wherein the view illustrates how some of the CTRF plates are deployed and eight of the CTRF plates are still stored (6 on the second layer, 2 on the first layer), but all CTRF plates are now an integral component of the ESW containers, therein providing restraint apparatus for safe shipping with conventional shipping gear on flatbed tractor-trailers.

FIG. 7 illustrates how the restraint apparatus is used to secure at least one layer of containers to a trailer bed. The restraint apparatus enables securing a stack of containers during transportation, where the stack is at least one layer high, where each layer contains three containers (a center container and two side containers) lengthwise, wherein each container has four useable chambers in the lower aluminum extruded side walls (ESW), wherein an AFT END has a left extruded side-wall with a first occluded chamber and a right extruded side-wall with a second occluded chamber and a FWD END has an opposing left extruded side-wall with a third occluded chamber and an opposing right extruded side-wall with a fourth occluded chamber. A flatbed tractor trailer equipped with tie-down gear that includes four tensioned elements, wherein a tensioned element is selected from chains, cables, straps, and at least one tensioning element that is selected from ratchets, winches, and turnbuckles, wherein each restraint apparatus includes a first plate with a left abutment feature and a second plate with a right abutment feature element.

There is a first layer that includes three containers aligned parallel lengthwise enabling access to each restraint apparatus. Each first plate and each second plate has a longer section with an upper self-adjusting guide open channel and a finger lift and a shorter section with an upper projecting prong and a bottom projecting prong.

Each container is preloaded with a restraint apparatus stored in the four chambers, where in the storage position the finger lifts are nearly flush with the opening of the four chambers.

Securing to a trailer bed at least one layer of three containers that includes a center container 100C flanked by a left container 100L and a right container 100R, requires that an appropriate number of restraint apparatus plates are positioned. An AFT END and a FWD END of the layer each has three pairs of CTFR plates pre-filled and stored in chambers with occlusion tabs, for a potential of 12 CTFR plates, but only 8 CTFR plates need to be actually deployed. FIG. 8 is a side perspective partial view from one side of a stack with two layers, so only half of the chambers are visible.

The first plate 10 and the second plate 10' have been reversed and reseated in the center container 100C, wherein the pronged ends are projecting. Additionally, another first plate 10 that is proximate to a left rail 200L and another right plate 10' have been slide outward exposing two upper self-adjusting guide open channels. On an opposing side of the stack the counterpart plates are similarly deployed.

In no particular order, a right tensioned element 150R, (a chain) which can be affixed to the right rail 200R is draped over the upper self-adjusting guide open channel of the second plate 10', the right tensioned element 150R extends through the prongs of a proximate medial second plate 10', and extends further to the left rail 200L. A left tensioned element 150L, (shown as a chain) can be affixed to the left rail 200L is pulled/draped over the upper self-adjusting guide open channel of the first plate 10, and the chain 150L extends through the proximate center prongs of the first plate 10 and onward further to the left rail 200L.

On the opposing side of the stack the counterpart tensioned elements are similarly deployed.

The tension of the tensioned element is incrementally and uniformly increased, therein providing lateral and longitudinal restraint to the containers.

FIG. 7a illustrates that every chamber with an occlusion tab 115 in the containers on the second level are also is appropriately pre-filled with either a first plate 10 or a second plate 10'. Recall, there are 12 CTFR plates per layer. So a two layer stack would have a total of 24 CTFR plates, wherein only 8 are being actively used. The extra plates can serve as backup restrains, and make it much easier to keep track of whether the chamber holds a first plate with a left abutment or a second plate with a right abutment.

A system for restraining, on a trailer, at least one layer of munition containers, wherein said system includes:

at least three munition containers, wherein each container has an extruded side wall on at least a port side and a starboard side of the container, wherein the extruded side walls extend to a forward end and an aft end terminating as a plurality of open ended chambers, wherein there is a forward left second chamber with a forward left occlusive tab, a forward right second chamber with a forward right occlusive tab, an aft right second chamber with an aft right occlusive tab, and an aft end left second chamber with an aft left occlusive tab; wherein the occlusive tabs impart shape restrictions to the second chambers;

In the system, each of the second chambers is preloaded with a CTRF plate that is a first plate or a second plate, wherein the CTRF plate includes: a longer section and a shorter section; where the longer section has an upper self-adjusting guide open channel that can function to elevate a tensioned element selected from a group consisting of chains, cables, straps, and combinations thereof, and a terminal opening that functions as a finger lift to facilitate removal of one of the metal CTRF plates stored in one of the second chambers; wherein the shorter section of the first plate has a pronged end with a first pronged end with an upper projecting first prong, a bottom projecting first prong and a left abutting wall and the shorter section of the second plate has an upper projecting second prong, a bottom projecting second prong and a right abutting wall; wherein the default storage position is that the finger lifts are nearly flush with the opening of each of the second chambers.

The system's CTRF plates on the containers are adjusted to receive the tensioned elements.

In no particular order, the four CTRF plates in the center container are removed and reversed so that the prongs on the pronged end are projecting and the left abutting wall and the right abutting wall are in contact with said occlusive tabs. Four CTRF plates are stored in the four chambers stored in corner chambers of the aft end and forward end. Only the CTFR plates in the corner chambers of the lateral containers are pulled out far enough to expose the upper self-adjusting guide open channels.

The tensioned elements are attached to a proximate point of a trailer's side railing, wherein the proximate point is selected to provide resistance against movement of a layer's corner, therein traversing over the upper self-adjusting guide open channels and through the pronged end of one of the center container's reversed CTRF plate, traversing about orthogonally to a trailer's opposite side railing.

If needed, adding vertical support to a stack, and then tensioning the tensioned elements as needed with a tensioning element selected from a group consisting of ratchets, winches, turnbuckles and combinations thereof.

The invented apparatus is fastened more expeditiously and it is reusable, therefore less expensive and more environmentally friendly.

It is to be understood that the foregoing description and specific exemplary embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A restraint apparatus that facilitates securing a container during transportation, where the container has a chambered aluminum extruded side walls (ESW) with a left tab that partially occludes a left ESW chamber and a right tab that partially occludes a right ESW chamber, on a flatbed tractor trailer fitted with tie-down gear, comprising:

at least one pair of container truckload restraint feature (CTRF) plates, wherein each of the CTFR plates comprises two sections, a longer section and a shorter section, wherein the longer section has an upper self-adjusting guide open channel to elevate the tie-down gear, and a terminal opening that mainly functions as a finger lift for retrieving a fully chambered CTRF plate, wherein the shorter section has a pronged end with an upper projecting prong and a bottom projecting prong, wherein when the long section is situated in one of the chambered ESW's, the projecting prongs are configured as a guide for one of a chain and a cable, wherein the at least one pair of CTRF plates comprises a first plate and a second plate, wherein the first plate has a left side abutment feature, which is a right wall and functions as a left stop when the longer section of the first plate is inserted into the left ESW chamber, and wherein the second plate has a right side abutment feature, which is a left wall and functions as a right stop when the longer section of the second plate is inserted into the right ESW chamber.

2. The restraint apparatus according to claim 1, wherein the restraint apparatus has an overall length of about 18.75 inches, wherein said each of the CTRF plates includes a maximum thickness of about 1.25 inches and a maximum height of about 2.59 inches, and wherein the tie down gear includes at least one of chains, cables, turnbuckles, and straps.

3. The restraint apparatus according to claim 1, wherein the longer section has a length of about 10 inches, and the shorter section has a length of about 8.75 inches.

4. The restraint apparatus according to claim 1, wherein the upper prong and the bottom prong have a prong length of about 0.75 inches long.

5. The restraint apparatus according to claim 1, wherein the lower prong 31 at its widest is about 1.26 inches and is 0.4 inches thick, and the upper prong at its widest is 0.91 inches and is about 0.4 inches thick.

6. The restraint apparatus according to claim 1, wherein the prongs are separated by a prong space of 1.79 inches.

7. The restraint apparatus according to claim 1, wherein each sidewall of the longer section has a height of about 1.5 inches high, and a total thickness from a left side to a right side of about 1.26 inches.

8. The restraint apparatus according to claim 1, wherein the upper self-adjusting guide open channel begins about 1.5 inches from an end of the longer section of each CTFR plate, and the upper self-adjusting guide open channel has a channel length of 2 inches and a channel depth of 0.5 inches.

9. The restraint apparatus according to claim 1, wherein the terminal opening is circular, and has a diameter of about 0.75 inches, and the center of the terminal opening is substantially adjacent from a bottom of the restraint apparatus.

10. The restraint apparatus according to claim 9, wherein access to the finger lift is available through a bottom opening having diameter of about 0.5 inches, and is coextensive with each said terminal opening.

11. The restraint apparatus according to claim 1, wherein the left side abutment feature of the first plate is on a right side of the shorter section.

12. The restraint apparatus according to claim 1, wherein the right side abutment feature of the second plate is on a left side of the shorter section.

13. A restraint apparatus that facilitates securing a stack of containers during transportation, where the stack is at least one layer high, where each of said at least one layer contain's three containers lengthwise, and each of the containers has four useable chambers in a plurality of lower aluminum extruded side walls (ESW), wherein the four useable chambers includes a first chamber and a second chamber, wherein each of the plurality of the aluminum extruded side-walls includes the second chamber with a tab that partially occludes the second chamber, for use on a flatbed tractor trailer equipped with tie-down gear that includes a first tensioned element and a second tensioned element comprising:

two pairs of the restraint apparatus per container so that each said container includes a total of four CRTF plates, wherein each restraint apparatus is a pair of CTRF plates, wherein each of the pair of CTRF plates is comprised of a first plate or a second plate, wherein the first plate and the second plate each have two sections including a longer section and a shorter section, wherein the longer section includes an upper self-adjusting guide open channel configured to elevate at least one of the tensioned elements and a terminal opening configured as a finger lift to facilitate removal of the CTRF plate from a chamber, wherein the shorter section of the first plate has a pronged end that has an upper projecting prong, a bottom projecting prong, and a left abutting wall, wherein the shorter section of the second plate has a prong end, a bottom projecting prong and a right abutting wall, wherein each container is preloaded with the four CTRF plates, wherein when in a default storage position the finger lifts are nearly flush with opening of the four chambers, wherein the first tensioned element is affixed to a right rail of the flatbed tractor trailer, wherein the second tensioned element is affixed to a left rail of the flatbed tractor trailer, and wherein an opposing side of the stack is similarly connected, wherein the three containers include a center container and two side containers, wherein each of the first tensioned element and the second tensioned element is selected from at least one of chains, cables, and straps, and wherein the tie down gear includes a tensioning element selected from at least one of ratchets, winches, and turnbuckles.

\* \* \* \* \*